(12) United States Patent
Shimabara et al.

(10) Patent No.: US 6,635,328 B2
(45) Date of Patent: Oct. 21, 2003

(54) INTEGRAL SKIN FOAM MOLDED ARTICLE

(75) Inventors: Tetsuo Shimabara, Hiroshima (JP);
Kiyotaka Yanagisawa, Hiroshima (JP);
Shigenori Kawanoue, Hiroshima (JP);
Hideki Imai, Hiroshima (JP)

(73) Assignee: Nishikawa Kasei Co., Ltd.

( * ) Notice: Subject to any disclaimer, the term of this patent is extended or adjusted under 35 U.S.C. 154(b) by 54 days.

(21) Appl. No.: 09/962,202

(22) Filed: Sep. 26, 2001

(65) Prior Publication Data

US 2002/0052424 A1 May 2, 2002

(30) Foreign Application Priority Data

Oct. 30, 2000 (JP) .......................... 2000-329891

(51) Int. Cl.[7] ................................ B32B 3/00
(52) U.S. Cl. ......................... 428/71; 428/60
(58) Field of Search ................ 428/71, 57, 60

(56) References Cited

FOREIGN PATENT DOCUMENTS

| EP | 0 768 160 | 4/1997 |
|---|---|---|
| JP | 2000-6283 | 1/2000 |

*Primary Examiner*—Alexander S. Thomas
(74) *Attorney, Agent, or Firm*—Nixon Peabody LLP; Donald R. Studebaker

(57) ABSTRACT

An integral skin foam molded article having a core formed with an accommodating recess. An erected wall of the core around the accommodating recess is formed at its intermediate position with a core side step extending perpendicularly to the inner surface of the erected wall so that a bottom side portion of the accommodating recess is narrower than an opening side portion thereof. The skin includes a peripheral erected part with the peripheral erected part of the skin being formed at its intermediate position with a skin side step that is located closer to the opening of the accommodating recess than the core side step of the erected wall, that is extended perpendicularly to the peripheral erected part of the skin, and that is bent toward inside of the accommodating recess. The peripheral erected part of the skin is pressed against the inner surface of the erected wall of the core.

6 Claims, 4 Drawing Sheets

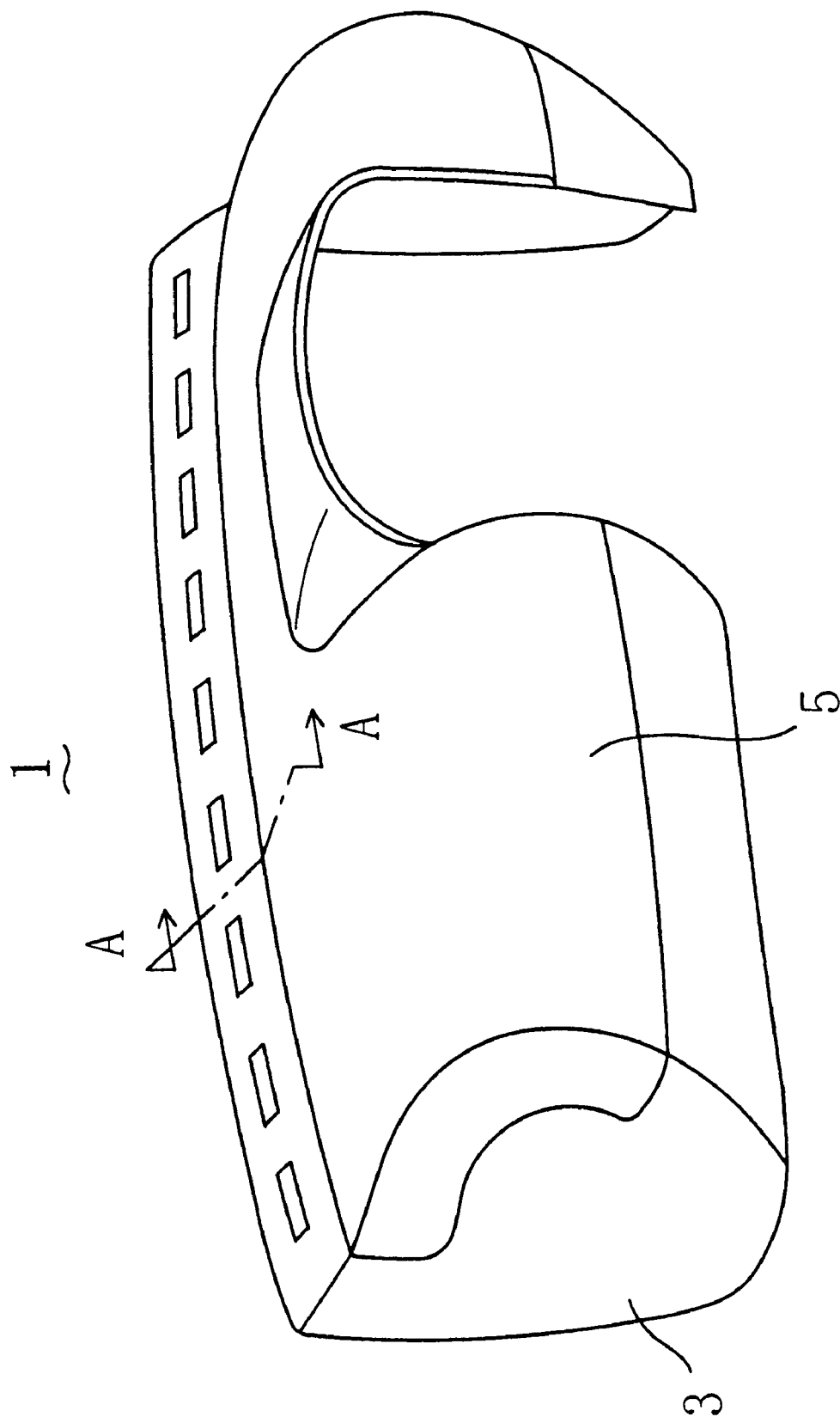

INTEGRAL SKIN FOAM MOLDED ARTICLE

BACKGROUND OF THE INVENTION

1. Field of the Invention

The present invention generally relates to an integral skin foam molded article, in which a foamed layer is formed between and integrally with a core and a skin.

2. Description of the Prior Art

The present applicant has already filed a patent application for an integral skin foam molded article as disclosed in Japanese Unexamined Patent Publication No. 2000-6283. In the article according to the invention of this patent application, a core is formed with an accommodating recess for accommodating a foamed layer. An erected wall of the core located around the accommodating recess is formed at its intermediate position with a step such that a bottom side portion of the accommodating recess is narrower than an opening side portion of the accommodating recess. A skin has a peripheral erected part bent from the circumference to the back of its main part. And the peripheral erected part of the skin is pressed against a portion of the erected wall located to surround the bottom side portion of the accommodating recess bounded by the step. Thus, the sealing properties of the article are ensured to prevent a foaming resin material from leaking to the surface side of the skin main part, thereby improving the appearance of the article.

Furthermore, according to the invention of this patent application, a peripheral narrow groove is opened in the skin peripheral erected part so as to be opposite to the step of the erected wall. Thus, the foaming resin material having penetrated between the skin peripheral erected part and the erected wall will be stored in the peripheral narrow groove. Also in this manner, the foaming resin material is prevented from leaking to the surface side of the skin main part, thereby improving the appearance of the article. Also, the presence of this peripheral narrow groove improves the stiffness of the skin peripheral erected part, thereby preventing waving of the skin which causes the leakage of the material.

If the skin is formed by slush molding, in order to form the above-described peripheral narrow groove in the skin peripheral erected part, a peripheral narrow protrusion for forming a peripheral narrow groove has to be provided in a slush mold. In this case, when the skin is demolded after the molding has been finished, the peripheral narrow groove portion of the skin peripheral erected part should be taken out of the peripheral narrow protrusion. However, since the peripheral narrow protrusion is stuck in the peripheral narrow groove, it is hard to take the peripheral narrow groove portion of the skin peripheral erected part out of the peripheral narrow protrusion.

SUMMARY OF THE INVENTION

It is therefore an object of the present invention to provide an integral skin foam molded article with sealing properties described above which has an easily demoldable skin structure even for the slush molded skin.

To achieve this object, the present invention is characterized in that a skin peripheral erected part is bent to correspond to the shape of a step of an erected wall.

Specifically, the present invention is intended for an integral skin foam molded article including: a core; a skin; a foamed layer formed between and integrally with the core and the skin; the core being formed with an erected wall constituting an accommodating recess which accommodates the foamed layer, the accommodating recess being opened to correspond to a region where the skin is formed; and the skin including a main part that covers an opening of the accommodating recess, and a peripheral erected part that is formed integrally with the main part to bend from the circumference to the back of the main part and engage an inner periphery of the erected wall. In the present invention, the following solutions are taken.

In the invention of claim 1, the erected wall of the core is formed at an intermediate position thereof with a core side step so that a portion of the accommodating recess closer to the bottom thereof than the core side step is narrower than a portion of the accommodating recess closer to the opening thereof than the core side step. The peripheral erected part of the skin is formed at an intermediate position thereof with a skin side step that is located closer to the opening of the accommodating recess than the core side step of the erected wall, the skin side step bending toward inside of the accommodating recess. An opening side peripheral erected portion of the peripheral erected part of the skin located closer to the opening of the accommodating recess than the skin side step is pressed against an opening side erected wall portion of the erected wall located closer to the opening of the accommodating recess than the core side step, while a bottom side peripheral erected portion of the peripheral erected part of the skin located closer to the bottom of the accommodating recess than the skin side step is pressed against a bottom side erected wall portion of the erected wall located closer to the bottom of the accommodating recess than the core side step.

In the above structure according to the invention of claim 1, the skin side step formed in the peripheral erected part of the skin provides a level difference in a direction from inside to outside of the accommodating recess because of the positional relationship between the opening side peripheral erected portion and the bottom side peripheral erected portion. Therefore when the skin is formed by slush molding, no peripheral narrow protrusion for forming a peripheral narrow groove is needed unlike the prior art and it can be avoided that the skin is hard to demold because the peripheral narrow protrusion gets stuck in the peripheral narrow groove. Accordingly, the skin can be smoothly demolded with small resistance.

Furthermore, since the opening side peripheral erected portion of the peripheral erected part of the skin is pressed against the opening side erected wall portion of the erected wall, while the bottom side peripheral erected portion of the peripheral erected part of the skin is pressed against the bottom side erected wall portion of the erected wall, a dual sealing structure can be obtained to prevent a foaming resin material from leaking to the surface side of the main part of the skin, thereby improving the appearance of the integral skin foam molded article.

Moreover, the skin side step increases the stiffness of the peripheral erected part of the skin, thereby preventing waving of the skin which causes the leakage of the foaming resin material.

The invention of claim 2 is based on the invention of claim 1 and characterized in that a gap is formed between the skin side step and the core side step.

In the above structure according to the invention of claim 2, even if the foaming resin material penetrates between the bottom side erected wall portion of the erected wall and the bottom side peripheral erected portion of the peripheral erected part of the skin and further reaches between the core side step and the skin side step, the foaming resin material is stored in the gap between the skin side step and the core side step, thereby preventing the foaming resin material from leaking to the surface side of the main part of the skin. As a result, the improvement in appearance of the integral skin foam molded article can be ensured.

The invention of claim 3 is based on the invention of claim 1 and characterized in that the skin side step is pressed against the core side step.

In the above structure according to the invention of claim 3, the skin can be positioned at a right location as a result of the pressing of the skin side step against the core side step. Accordingly, the boundary between the core and the skin can be defined well, thus improving the appearance of the integral skin foam molded article.

Furthermore, the existence of the skin side step and the core side step can increase the contact area between the peripheral erected part of the skin and the erected wall of the core. As a result, the sealing properties of the article can be further improved.

The invention of claim 4 is based on the invention of claim 1 and characterized in that, in the vicinity of a corner at which the bottom side peripheral erected portion of the peripheral erected part of the skin intersects with the skin side step, a thin hinge part is formed for facilitating leaning of the bottom side peripheral erected portion against the bottom side erected wall portion of the erected wall of the core.

In the above structure according to the invention of claim 4, the foaming pressure during the molding allows the bottom side peripheral erected portion of the peripheral erected part of the skin to lean against the bottom side erected wall portion by action of the thin hinge part as a fulcrum and to be thereby pressed against it. Thus, the bottom side peripheral erected portion of the skin tightly engages the bottom side erected wall portion with certainty. As a result, the sealing properties of the article can be further improved.

The invention of claim 5 is based on the invention of claim 1 and characterized in that the core side step has a depression that is opened to face the skin side step.

In the above structure according to the invention of claim 5, even if the foaming resin material penetrates between the bottom side erected wall portion of the erected wall and the bottom side peripheral erected portion of the peripheral erected part of the skin and further reaches between the core side step and the skin side step, the foaming resin material is stored in the depression formed in the core side step, thereby preventing the foaming resin material from leaking to the surface side of the skin main part. As a result, the sealing properties of the article are further improved.

Moreover, the depression is opened to the direction in which the core is demolded, and thus under cut will not be created. Accordingly, the mold needs no slide core to form the depression, thus reducing the cost of the mold.

BRIEF DESCRIPTION OF THE DRAWINGS

FIG. 6 is a perspective view illustrating an instrument panel as an integral skin foam molded article.

DESCRIPTION OF THE PREFERRED EMBODIMENTS

Hereinafter, preferred embodiments of the present invention will be described with reference to the accompanying drawings.

Embodiment 1

FIG. 6 illustrates an instrument panel 1 that is an automotive interior trim article as an integral skin foam molded article. This instrument panel 1 includes a core 3, a skin 5, and a foamed layer 7 (shown in FIGS. 1 through 5) that is formed between and integrally with the core 3 and the skin 5. In this exemplary embodiment, the skin 5 is provided substantially in the entire upper panel part of the instrument panel 1, and the core 3 is exposed in the other part in which the skin 5 is not provided. These core 3, skin 5, and foamed layer 7 are made of resin that has been well known and widely used in the prior art. Examples of the resin include thermo plastic olefin (TPO) for the core 3, olefin resin for the skin 5 which is subjected to slush molding to form a flexible skin, and polyurethane foam for the foamed layer 7. Also, the instrument panel 1 is molded, for example, as follows. First, the skin 5 that has been slush molded in advance is set in a lower mold member of a mold, while the core 3 that has been injection molded in advance is set in an upper mold member of the mold. Next, before or after the upper and lower mold members are clamped, foamable polyurethane resin material is injected into a cavity defined by the upper and lower mold members. Then, the injected resin material is foamed and cured so that the foamed layer 7 is formed between and integrally with the core 3 and the skin 5.

Figure 1:
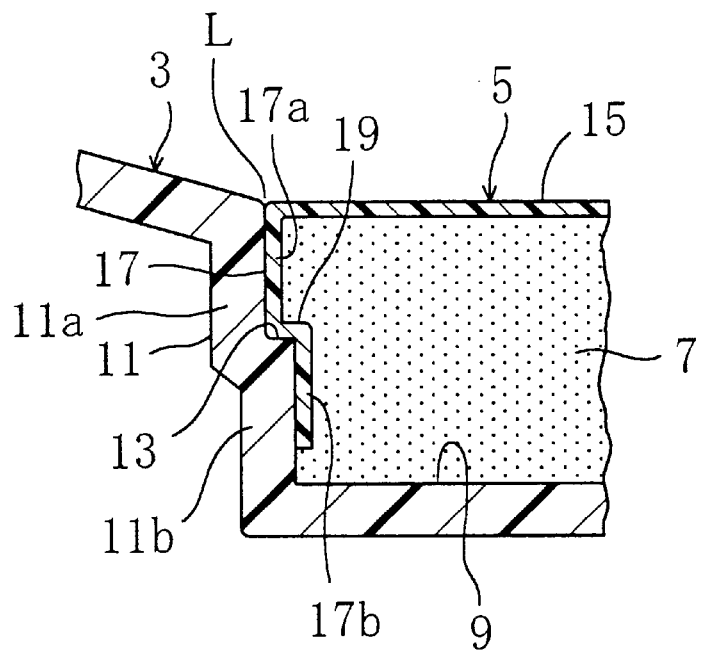
FIG. 1 illustrates an instrument panel as an integral skin foam molded article according to EMBODIMENT 1 of the present invention and is a cross-sectional view taken along the line A—A shown in FIG. 6.

FIG. 1 is a cross-sectional view taken along the line A—A shown in FIG. 6 and shows the feature of an integral skin foam molded article according to EMBODIMENT 1 of the present invention. Specifically, the core 3 is formed with an accommodating recess 9, which is opened to correspond to the region where the skin 5 is formed, for accommodating the foamed layer 7. A peripheral wall of this accommodating recess 9 constitutes an erected wall 11, and the erected wall 11 surrounds the foamed layer 7. The erected wall 11 is formed, at an intermediate position thereof in the depth direction of the accommodating recess 9, with a core side step 13 so that a portion of the accommodating recess 9 closer to the bottom thereof than the core side step 13 is narrower than a portion of the accommodating recess 9 closer to the opening thereof than the core side step 13.

On the other hand, the skin 5 includes a main part 15 that covers the opening of the accommodating recess 9, and a peripheral erected part 17 that is formed integrally with the main part 15 to bend from the circumference to the back of the main part 15 and engage the inner periphery of the erected wall 11. The peripheral erected part 17 of the skin is formed, at an intermediate position thereof in the depth direction of the accommodating recess 9, with a skin side step 19 that is located closer to the opening of the accommodating recess 9 than the core side step 13 of the erected wall 11 and that is bent toward inside of the accommodating recess 9.

Further, an opening side peripheral erected portion 17a of the peripheral erected part 17 of the skin 5 located closer to the opening of the accommodating recess 9 than the skin side step 19 is pressed against an opening side erected wall portion 11a of the erected wall 11 located closer to the opening of the accommodating recess 9 than the core side step 13, while a bottom side peripheral erected portion 17b of the peripheral erected part 17 of the skin 5 located closer to the bottom of the accommodating recess 9 than the skin side step 19 is pressed against a bottom side erected wall portion 11b of the erected wall 11 located closer to the bottom of the accommodating recess 9 than the core side step 13. Furthermore, the skin side step 19 is pressed against the core side step 13. The foaming pressure of the foaming resin material during the molding of the foamed layer 7 allows the above-described pressing. Accordingly, also in the article in which the foaming resin material has been foamed and cured, the condition of the pressing is still maintained.

Furthermore, the tip of the bottom side peripheral erected portion 17b of the peripheral erected part 17 of the skin 5 does not reach the bottom face of the accommodating recess 9, thus forming a gap therebetween. Therefore in molding the foamed layer 7, air resulting from the foaming of the foaming resin material is discharged outside from between the bottom side peripheral erected portion 17b and the bottom side erected wall portion 11b.

Accordingly, the erected wall 11 of the core 3 and the peripheral erected part 17 of the skin 5 can be sealed at two places, i.e., on both sides of the boundary defined by the core side step 13 and the skin side step 19. And this dual sealing structure can prevent the foaming resin material from leaking to the surface side of the main part 15 of the skin 5, thereby forming the instrument panel 1 of good appearance.

Also, since the skin side step 19 is pressed against the core side step 13, the skin 5 can be positioned at a right location. Accordingly, the boundary L between the core 3 and the skin 5 can be defined well, thus improving the appearance of the instrument panel 1.

Furthermore, the existence of the skin side step 19 and the core side step 13 can increase the contact area between the peripheral erected part 17 of the skin 5 and the erected wall 11 of the core 3, thereby further improving the sealing properties of the article.

Besides, the existence of the skin side step 19 can increase the stiffness of the peripheral erected part 17 of the skin 5, thereby preventing waving of the peripheral erected part 17 of the skin 5 which causes the leakage of the material.

Moreover, the skin side step 19 formed in the peripheral erected part 17 of the skin 5 provides a level difference in a direction from inside to outside of the accommodating recess 9 because of the positional relationship between the opening side peripheral erected portion 17a and the bottom side peripheral erected portion 17b. Thus, even if the skin 5 is slush molded, it can be avoided unlike the prior art example that the skin 5 is hard to demold because the peripheral narrow protrusion for forming the peripheral narrow groove gets stuck in the peripheral narrow groove. Consequently, the skin 5 can be smoothly demolded with small resistance.

Embodiment 2

Figure 2:
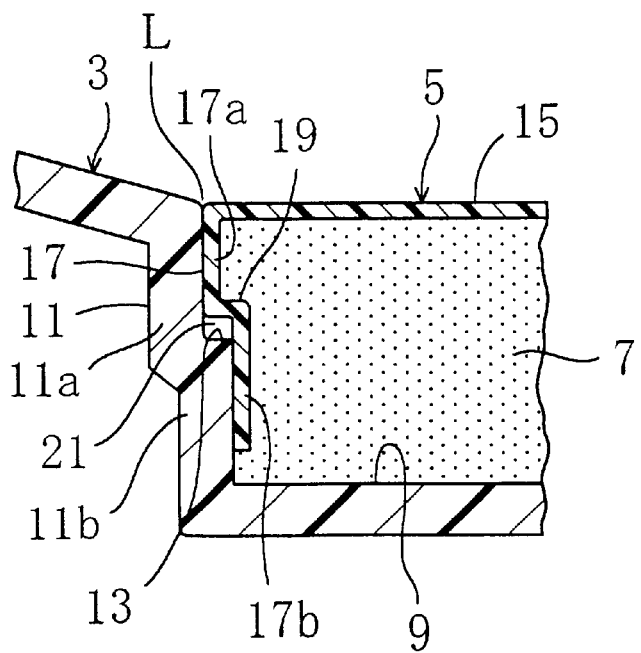
FIG. 2 illustrates an instrument panel as an integral skin foam molded article according to EMBODIMENT 2 of the present invention and is a cross-sectional view taken along the line A—A shown in FIG. 6.

FIG. 2 is a cross-sectional view taken along the line A—A shown in FIG. 6 like EMBODIMENT 1 and shows the feature of an integral skin foam molded article according to EMBODIMENT 2 of the present invention.

In EMBODIMENT 2, a gap 21 of rectangular cross section is formed between the skin side step 19 and the core side step 13 to take the shape of a ring around the entire periphery of the peripheral erected part 17 of the skin 5. Other than this feature, the instrument panel 1 is formed in the same way as EMBODIMENT 1. Therefore the same constituent members are identified by the same reference characters as those used in EMBODIMENT 1 and the detailed description thereof will be omitted.

Accordingly, in EMBODIMENT 2, the same effects as in EMBODIMENT 1 are attainable except the effects obtained by the pressing of the skin side step 19 against the core side step 13 in EMBODIMENT 1.

Furthermore, in EMOBODIMENT 2, even if the foaming resin material penetrates between the bottom side erected wall portion 11b of the erected wall 11 and the bottom side peripheral erected portion 17b of the peripheral erected part 17 and further reaches between the core side step 13 and the skin side step 19, the foaming resin material is stored in the gap 21 formed between the skin side step 19 and the core side step 13, thereby preventing the foaming resin material from leaking to the surface side of the main part 15 of the skin 5. As a result, the improvement in appearance of the instrument panel 1 can be ensured.

Embodiment 3

Figure 3:
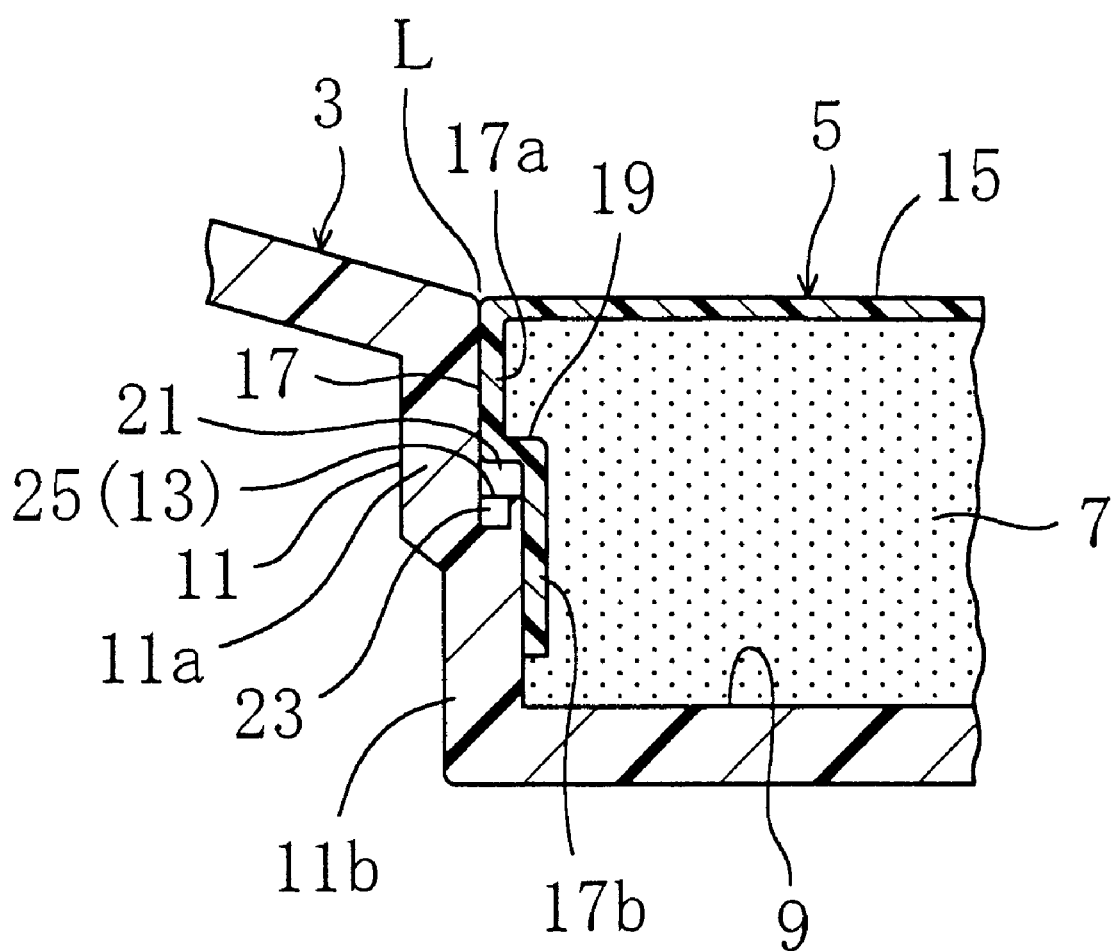
FIG. 3 illustrates an instrument panel as an integral skin foam molded article according to EMBODIMENT 3 of the present invention and is a cross-sectional view taken along the line A—A shown in FIG. 6.

FIG. 3 is also a cross-sectional view taken along the line A—A shown in FIG. 6 like EMBODIMENT 1 and shows the feature of an integral skin foam molded article according to EMBODIMENT 3 of the present invention.

In EMBODIMENT 3, the core side step 13 has depressions 23 that are opened to face the skin side step 19 and are rectangular in cross section. The depressions 23 are formed to take the shape of a ring around the entire periphery of the peripheral erected part 17 of the skin 5 in an intermittent manner with each partition wall 25 interposed between the adjacent depressions 23. Alternatively, instead of forming the partition walls 25, a continuous depression 23 may be formed. In this embodiment, like EMBODIMENT 2, the gap 21 of rectangular cross section is formed between the skin side step 19 and the core side step 13 to take the shape of a ring around the entire periphery of the peripheral erected part 17 of the skin 5. Alternatively, instead of forming this gap 21, the skin side step 19 may be pressed against the core side step 13 like EMBODIMENT 1. Other than these features, the instrument panel 1 is formed in the same way as EMBODIMENT 2. Therefore the same constituent members are identified by the same reference characters and the detailed description thereof will be omitted.

Accordingly, in EMBODIMENT 3, the same effects as in EMBODIMENT 1 and EMBODIMENT 2 are attainable.

Furthermore, in EMBODIMENT 3, even if the foaming resin material penetrates between the bottom side erected wall portion 11b of the erected wall 11 and the bottom side peripheral erected portion 17b of the peripheral erected part 17 and further reaches between the core side step 13 and the skin side step 19, the foaming resin material is stored in the gap 21 and the depressions 23 formed in the core side step 13, thereby further improving the sealing properties of the instrument panel 1.

Moreover, the depressions 23 are opened to the direction in which the core 3 is demolded, and thus under cut will not be created. Accordingly, the mold needs no slide core to form the depressions 23, thus reducing the cost of the mold.

MODIFIED EXAMPLE 1

Figure 4:
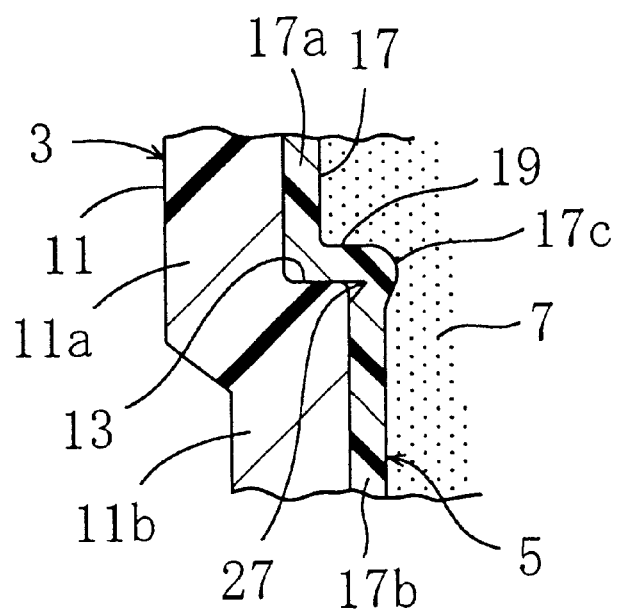
FIG. 4 is an enlarged cross-sectional view illustrating part of an instrument panel where the core side step and the skin side step overlap in MODIFIED EXAMPLE 1.

FIG. 4 is an enlarged cross-sectional view illustrating part of an instrument panel where the core side step 13 and the skin side step 19 overlap in MODIFIED EXAMPLE 1.

In MODIFIED EXAMPLE 1, in a corner 17c at which the bottom side peripheral erected portion 17b of the peripheral erected part 17 of the skin 5 intersects with the skin side step 19, a thin hinge part 27 is formed for facilitating leaning of the bottom side peripheral erected portion 17b against the bottom side erected wall portion 11b of the erected wall 11 of the core 3. Other than this feature, the instrument panel 1 is formed in the same way as EMBODIMENT 1. Therefore the same constituent members are identified by the same reference characters as those used in EMBODIMENT 1 and the detailed description thereof will be omitted. The foaming pressure of the foaming resin material during the molding of the foamed layer 7 allows the leaning of the bottom side peripheral erected portion 17b. The corner 17c is formed during the molding of the skin 5. It should be noted that the thin hinge part 27 may be formed slightly away from the corner 17c and slightly closer to the bottom side peripheral erected portion 17b than the position shown in FIG. 4. Moreover, the skin 5 formed with the thin hinge part 27 may also be applicable to EMBODIMENTS 2 and 3.

Accordingly, in MODIFIED EXAMPLE 1, the same effects as in EMBODIMENT 1 are attainable.

Furthermore, in MODIFIED EXAMPLE 1, the foaming pressure during the molding allows the bottom side peripheral erected portion 17b of the peripheral erected part 17 of the skin 5 to easily lean against the bottom side erected wall portion 11b of the core 3 by action of the thin hinge part 27 as a fulcrum and to be thereby pressed against it. Thus, the bottom side peripheral erected portion 17b tightly engages the bottom side erected wall portion 11b with certainty. As a result, the sealing properties of the instrument panel 1 can be further improved.

MODIFIED EXAMPLE 2

Figure 5:
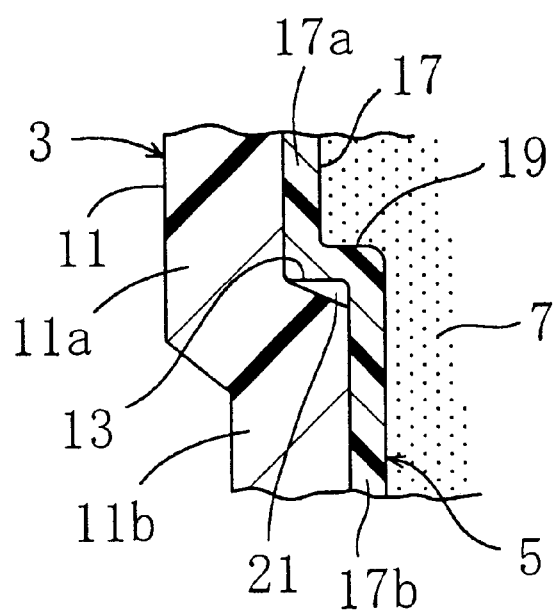
FIG. 5 is an enlarged cross-sectional view illustrating part of an instrument panel where the core side step and the skin side step overlap in MODIFIED EXAMPLE 2.

FIG. 5 is an enlarged cross-sectional view illustrating part of an instrument panel where the core side step 13 and the skin side step 19 overlap in MODIFIED EXAMPLE 2.

MODIFIED EXAMPLE 2 is based on EMBODIMENT 1 described with reference to FIG. 1. In MODIFIED EXAMPLE 2, the core side step 13 is formed to provide a surface which inclines downwardly inwards the accommodating recess 9 so that a gap 21 of triangular cross section is formed between the core side step 13 and the skin side step 19 although its shape differs from that of the gap 21 in EMBODIMENT 2 illustrated in FIG. 2. Other than this feature, the instrument panel 1 is formed in the same way as EMBODIMENT 1. Therefore the same constituent members are identified by the same reference characters as those used in EMBODIMENT 1 and the detailed description thereof will be omitted.

Accordingly, in MODIFIED EXAMPLE 2, the same effects as in EMBODIMENTS 1 and 2 are attainable except the effects obtained by the pressing of the skin side step 19 against the core side step 13 in EMBODIMENT 1.

Although each of the foregoing embodiments and modified examples has been described on the supposition that the integral skin foam molded article is the instrument panel 1 as an automotive interior trim article, the inventive integral skin foam molded article may be applied to any other molded article for door trim or trim other than automotive interior trim.

What is claimed is:

1. An integral skin foam molded article comprising: a core; a skin; and a foamed layer formed between and integrally with the core and the skin; the core being formed with an erected wall constituting an accommodating recess which accommodates the foamed layer, the accommodating recess being opened to correspond to a region where the skin is formed; and the skin including a main part that covers an opening of the accommodating recess, and a peripheral erected part that is formed integrally with the main part to bend from the circumference to the back of the main part and engage an inner periphery of the erected wall, wherein the erected wall of the core is formed at an intermediate position thereof with a core side step extending perpendicularly to the inner surface of the erected wall so that a portion of the accommodating recess closer to the bottom thereof than the core side step is narrower than a portion of the accommodating recess closer to the opening thereof than the core side step, wherein the peripheral erected part of the skin is formed at an intermediate position thereof with a skin side step that is located closer to the opening of the accommodating recess than the core side step of the erected wall, and that is extended perpendicularly to the peripheral erected part of the skin, the skin side step bending toward inside of the accommodating recess, and wherein an opening side peripheral erected portion of the peripheral erected part of the skin located closer to the opening of the accommodating recess than the skin side step is pressed against an opening side erected wall portion of the erected wall along the length of the opening side peripheral erected portion, the opening side erected wall portion being located closer to the opening of the accommodating recess than the core side step, while a bottom side peripheral erected portion of the peripheral erected part of the skin located closer to the bottom of the accommodating recess than the skin side step is pressed against a bottom side erected wall portion of the erected wall located closer to the bottom of the accommodating recess than the core side step.

2. The integral skin foam molded article of claim 1, wherein a gap is formed between the skin side step and the core side step.

3. The integral skin foam molded article of claim 1, wherein the skin side step is pressed against the core side step.

4. The integral skin foam molded article of claim 1, wherein in the vicinity of a corner at which the bottom side peripheral erected portion of the peripheral erected part of the skin intersects with the skin side step, a thin hinge part is formed for facilitating leaning of the bottom side peripheral erected portion against the bottom side erected wall portion of the erected wall of the core.

5. The integral skin foam molded article of claim 1, wherein the core side step has a depression that is opened to face the skin side step.

6. An integral skin foam molded article comprising:

a core;

a skin; and a foamed layer formed between and integrally with the core and the skin, the core being formed with an erected wall constituting an accommodating recess which accommodates the foamed layer, the accommodating recess being opened to correspond to a region where the skin is formed, and the skin including a main part that covers an opening of the accommodating recess and a peripheral erected part that is formed integrally with the main part to bend from the circumference to the back of the main part and engage an inner periphery of the erected wall, wherein the erected wall of the core is formed at an intermediate position thereof with a core side step extending so that a portion of the accommodating recess closer to the bottom thereof than the core side step is narrower than a portion of the accommodating recess closer to the opening thereof than the core side step, wherein the peripheral erected part of the skin is formed at an intermediate position thereof with a skin side step that is located closer to the opening of the accommodating recess than the core side step of the erected wall, the skin side step bending toward inside of the accommodating recess with the core side step having a depression that is opened to face the skin side step, and wherein an opening side peripheral erected portion of the peripheral erected part of the skin located closer to the opening of the accommodating recess than the skin side step is pressed against an opening side erected wall portion of the erected wall located closer to the opening of the accommodating recess than the core side step, while a bottom side peripheral erected portion of the peripheral erected part of the skin located closer to the bottom of the accommodating recess than the skin side step is pressed against a bottom side erected wall portion of the erected wall located closer to the bottom of the accommodating recess than the core side step.

* * * * *